United States Patent [19]
Nemoto et al.

[11] Patent Number: 5,254,075
[45] Date of Patent: Oct. 19, 1993

[54] INTERNAL CIRCULATION TYPE CENTRIFUGAL EXTRACTOR

[75] Inventors: Shin-ichi Nemoto; Ryo Shimizu; Hiroshi Takeda, all of Ibaraki; Tomio Kawata, Katsuta, all of Japan

[73] Assignee: Doryokuro Kakunenryo Kaihatsu Jigyodan, Tokyo, Japan

[21] Appl. No.: 801,667

[22] Filed: Dec. 2, 1991

[30] Foreign Application Priority Data

Dec. 18, 1990 [JP] Japan .................. 2-403017

[51] Int. Cl.$^5$ ............................. B04B 1/00
[52] U.S. Cl. ..................... 494/35; 494/56; 494/65
[58] Field of Search .......... 494/60, 62, 63, 65, 494/67, 56, 80, 35

[56] References Cited

U.S. PATENT DOCUMENTS

| | | | |
|---|---|---|---|
| 1,433,342 | 10/1922 | Coote | 494/63 |
| 2,510,781 | 6/1950 | Howard | 494/62 |
| 2,940,662 | 6/1960 | Applegate | 494/65 |
| 3,931,928 | 1/1976 | Kido | 494/65 |
| 4,406,651 | 9/1983 | Dudrey et al. | 494/63 |
| 4,857,040 | 8/1989 | Kashihara et al. | 494/60 |
| 4,932,933 | 6/1990 | Becker et al. | 494/62 |
| 4,959,158 | 9/1990 | Meikrantz | 494/56 |
| 5,024,647 | 6/1991 | Jubin et al. | 494/60 |

FOREIGN PATENT DOCUMENTS 528100 10/1976 U.S.S.R. .

*Primary Examiner*—Chris K. Moore
*Assistant Examiner*—Reginald L. Alexander
*Attorney, Agent, or Firm*—Wenderoth, Lind & Ponack

[57] ABSTRACT

A centrifugal extractor for making liquid-liquid extraction by bringing an organic phase and an aqueous phase into mutual contact and utilizing centrifugal force. A rotor rotating at a high speed is disposed inside a cylindrical casing having inlets for both phases. Draw ports for both phases are disposed at an upper portion of the rotor. An organic phase/aqueous phase mixture mixed at the bottom of the casing enters the rotor from the bottom of the rotor, and is subjected to phase separation by centrifugal force. The separated phases are withdrawn from respective draw ports. Part of the organic phase discharged from the organic phase draw port is refluxed to the bottom of the casing by a reflux cover fitted to the upper part of the rotor. The flow rate of the organic phase thus refluxed is added to the flow rate of the organic phase introduced from outside into the casing. Therefore, the flow rate ratio can be brought close to 1 inside the extractor, even if the flow rate of the aqueous phase is greater than that of the organic phase.

4 Claims, 6 Drawing Sheets

INTERNAL CIRCULATION TYPE CENTRIFUGAL EXTRACTOR

BACKGROUND OF THE INVENTION

The present invention relates to a centrifugal extractor capable of liquid-liquid extraction by bringing an organic phase into contact with an aqueous phase and utilizing centrifugal force. More particularly, the present invention relates to an improved centrifugal extractor capable of obtaining high extraction efficiency even when a flow rate ratio of both phases is great.

In a reprocessing of a spent nuclear fuel and in a nuclide separation recovery process, the centrifugal extractor of the present invention can advantageously be used particularly in a system having a large flow rate ratio such as for solvent washing and dodecane washing. However, the extractor of the present invention is not limited to this application and can widely be used for liquid-liquid extraction by bringing an organic phase and an aqueous phase into mutual contact.

A centrifugal extractor forcibly separates a mixed solution of an organic phase and an aqueous phase by centrifugal force, and its typical structure is shown in FIG. 9. The centrifugal extractor shown in the drawing fundamentally comprises a cylindrical casing 1 and a cylindrical rotor 3 which is rotated at a high speed by a rotary shaft 2 inside the casing 1. An organic phase O and an aqueous phase A are supplied to a mixing portion 6 at the bottom of the casing 1 from an organic phase inlet 4 and an aqueous phase inlet 5, respectively, and are mixed between the casing 1 and the rotating rotor 3. The mixed solution is introduced into a phase separation portion 8 from a supply port 7 at a lower part of the rotor. The aqueous phase A having a greater specific gravity is separated outward while the organic phase O having a smaller specific gravity is separated inward, and they rise upwards along the inner peripheral surface of the rotor 1. The aqueous phase A having a greater specific gravity and existing on the outer side of an interface K overflows from a weir 9 for discharging the aqueous phase and is discharged outside the casing from an aqueous phase draw port 10 and an aqueous phase outlet 11. The organic phase O having a smaller specific gravity and existing on the inner side of the interface K overflows from a weir 12 for discharging the organic phase and is discharged from an organic phnase draw port 13 and an organic phase outlet 14 outside the casing 1. The organic phase and the aqueous phase thus discharged are sent to a centrifugal extractor of the next stage, if required, and subjected to multi-stage extraction.

FIG. 10 is a flow diagram of a multi-stage counter flow system which disposes conventional centrifugal extractors in multiple stages and brings the organic phase and the aqueous phase into counter flow contact with each other. Each centrifugal extractor comprises a mixing portion M and a phase separation portion S, and a plurality of such extractors are disposed in multiple stages such as an i−1 stage, an i stage, an i+1 stage, an i+2 stage, and so forth. The organic phase is introduced into the extractor of the i−1 stage and is finally discharged from the extractor of the i+2 stage. On the other hand, the aqueous phase is introduced into the i+2 stage extractor and is finally discharged from the i−1 stage extractor. The flow rate ratio in the mixing portion M and phase separation portion S of the extractor of each stage is primarily determined by the flow rate $F_o$ of the organic phase and the flow rate $F_a$ of the aqueous phase and can be expressed by $F_a/F_o$. In the case of dodecane washing where $F_o$ is extremely smaller than $F_a$, for example, $F_a$ (flow rate of the aqueous phase) / $F_o$ (flow rate of dodecane) becomes about 100. For this reason, sufficient contact and mixing between both phases cannot be achieved inside the mixing portion M of the extractor (mixing portion 6 shown in FIG. 9) and a limit is imposed on extraction efficiency.

When the flow rate ratio becomes great (or in other words, when the flow rate of the aqueous phase becomes greater than that of the organic phase), the interface K inside the rotor 3 (see FIG. 9) moves towards the center of the rotor, and mixture of the aqueous phase into the discharged organic phase (entrainment) increases. In the reverse case, the interface K moves towards the inner peripheral surface side of the rotor and mixture of the organic phase into the discharged aqueous phase increases.

A structure capable of adjusting the height of the weir in order to prevent destabilization of the interface K inside the rotor due to fluctuation of the flow rate ratio has been proposed (Japanese Patent Publication No. 55985/1988). In the case of a fixed weir, there have also been proposed a structure which enlarges the size of a severer condition side, that is, the size of the extractor, so as to provide a greater margin, and a structure which disposes a weir chamber and blows compressed air from outside into this weir chamber through a rotary shaft in order to regulate the pressure and thus to control the interface K to be disposed at an optimum position.

However, in the case of the structure wherein compressed air is supplied, seals between the rotating rotary shaft and the compressed air supply portion and pipings for supplying compressed air to each stage are necessary, so that the structure becomes complicated and moreover, cannot be made compact. In the case of the structure capable of adjusting the height of the weir, the structure of the weir becomes complicated.

SUMMARY OF THE INVENTION

It is therefore an object of the present invention to provide a novel and improved centrifugal extractor which does not invite the drop of extraction efficiency particularly when the flow rate ratio of the aqueous phase/organic phase becomes great in a conventional centrifugal extractor, can keep the position of the interface between both phases stable and moreover, does not require a complicated structure.

The present invention provides an improvement in a conventional cenrifugal extractor of the type wherein an organic phase inlet and an aqueous phase inlet are disposed at a lower part of a cylindrical casing, an organic phase outlet and an aqueous phase outlet are disposed at an upper part of the casing, a cylindrical rotor rotating at a high speed is disposed inside the casing with a spacing from the inner wall of the casing, a supply port of an organic phase/aqueous phase mixed solution mixed at a mixing portion consisting of a gap between the bottom of the casing and the bottom of the rotor is disposed at the bottom of the rotor, an organic phase draw port and an aqueous phase draw port are disposed at positions at an upper part of the rotor corresponding to the organic phase outlet and the aqueous phase outlet, respectively, and an organic phase weir and an aqueous phase weir for guiding the organic phase and the aqueous phase separated from each other by centrifugal force inside the rotor to the organic phase draw port and to the aqueous phase draw port, respectively, are disposed inside the rotor.

An internal circulation type centrifugal extractor according to the present invention, is characterized in that a reflux means for circulating part of the organic phase withdrawn from the organic phase draw port to the mixing portion at the bottom of the casing is disposed between the organic phase draw port of the rotor and the organic phase outlet of the casing.

In such a position of the reflux means as described above, part of the organic phase is circulated to the mixing portion at the bottom of the casing. It is also possible, if required, to circulate part of the aqueous phase withdrawn from the aqueous phase draw port to the mixing portion at the bottom of the casing by disposing the reflux means between the aqueous phase draw port of the rotor and the aqueous phase outlet of the casing.

The organic phase and the aqueous phase that are supplied from the organic phase inlet and the aqueous phase inlet of the casing, respectively, are mixed in the mixing portion at the bottom of the casing and are introduced into the rotor from the organic phase/aqueous phase mixture supply port. The mixture is separated into the organic phase and the aqueous phase by centrifugal force inside the rotor, the organic phase is discharged outside from the organic phase discharge weir through the organic phase draw port of the rotor and through the organic phase outlet of the casing, while the aqueous phase is discharged from the aqueous phase discharge weir through the aqueous phase draw port and through the aqueous phase outlet of the casing. The operations described above are the same as those of the conventional centrifugal extractor.

In the present invention, part of the organic phase withdrawn from the organic phase draw port of the rotor or part of the aqueous phase withdrawn from the aqueous phase draw port of the rotor is returned to the mixing portion at the bottom of the casing by the reflux means. Therefore, when the flow rate of the aqueous phase is greater than that of the organic phase (or when the flow rate ratio is great), part of the organic phase is returned to the mixing portion at the bottom of the casing. In this way, the amount of the organic phase mixed with the aqueous phase at the mixing portion can be increased and the flow rate ratio (aqueous phase/organic phase) can be reduced to close to 1.

As a result, even when the flow rate of the aqueous phase introduced from the aqueous phase inlet of the casing is greater than the flow rate of the organic phase introduced from the organic phase inlet of the casing (or when the flow rate ratio is great), contact of the organic phase and the aqueous phase can be made sufficiently at the mixing portion, and extraction efficiency can thus be improved. Since the interface between the organic phase and the aqueous phase can be kept suitably in the phase separation portion within the rotor, mixture of the aqueous phase into the organic phase withdrawn from the weir can be prevented.

On the other hand, also when the flow rate of the organic phase is greater than that of the aqueous phase, the amount of the aqueous phase in the mixing portion can be increased by returning part of the aqueous phase withdrawn from the aqueous phase draw port to the mixing portion at the bottom of the casing, and the same effect as described above can be obtained.

PREFERRED EMBODIMENTS OF THE INVENTION

Figure 1:
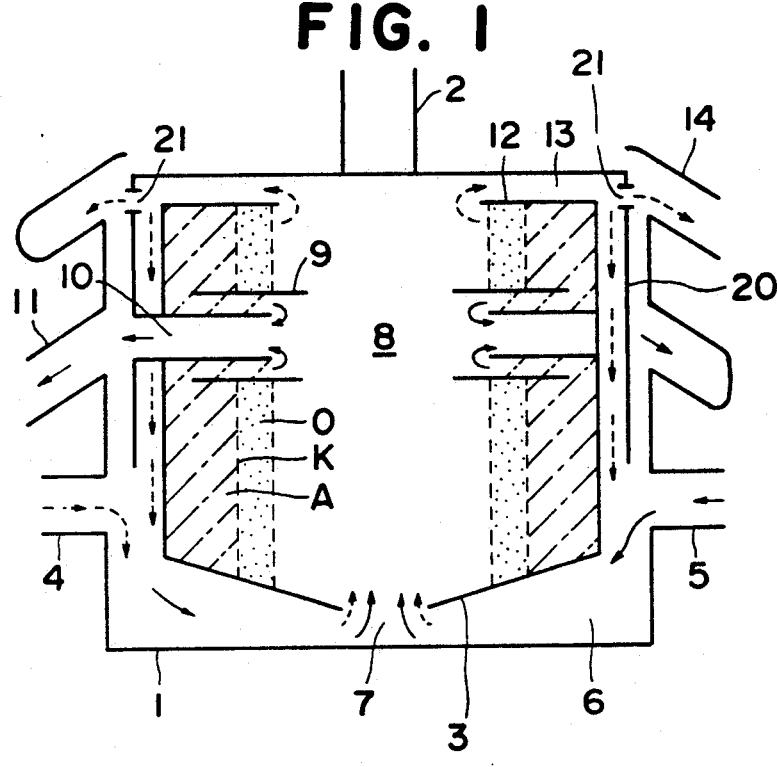
FIG. 1 is a sectional view showing an embodiment of an internal circulation type centrifugal extractor of the present invention.

FIG. 1 shows an embodiment of the internal circulation type centrifugal extractor of the present invention. In FIG. 1, like reference numerals are put to the same constituent elements as those of the conventional centrifugal extractor shown in FIG. 9, and the explanation of such constituent elements will be omitted.

Figure 9:
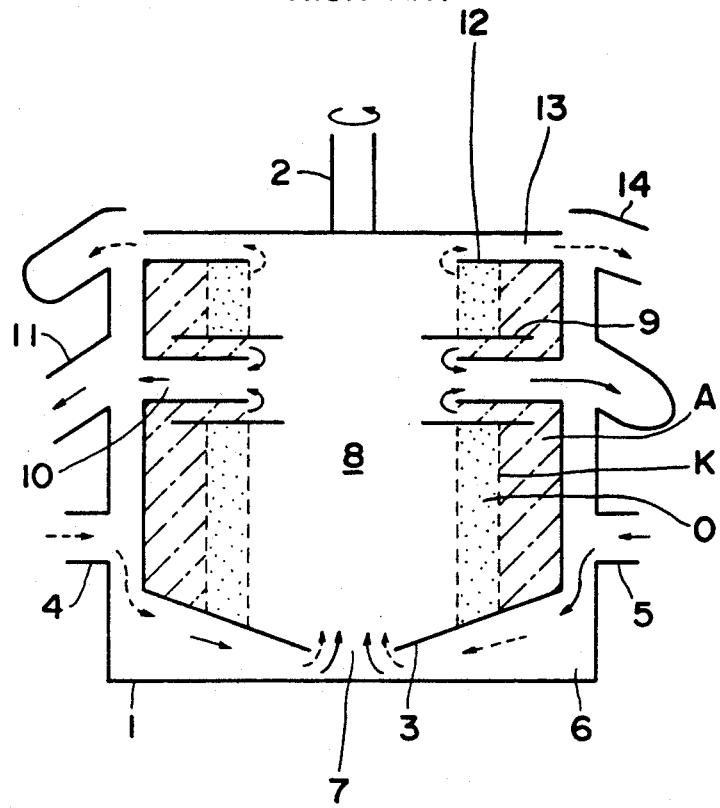
FIG. 9 is a sectional view showing an example of a conventional centrifugal extractor.
Figure 10:
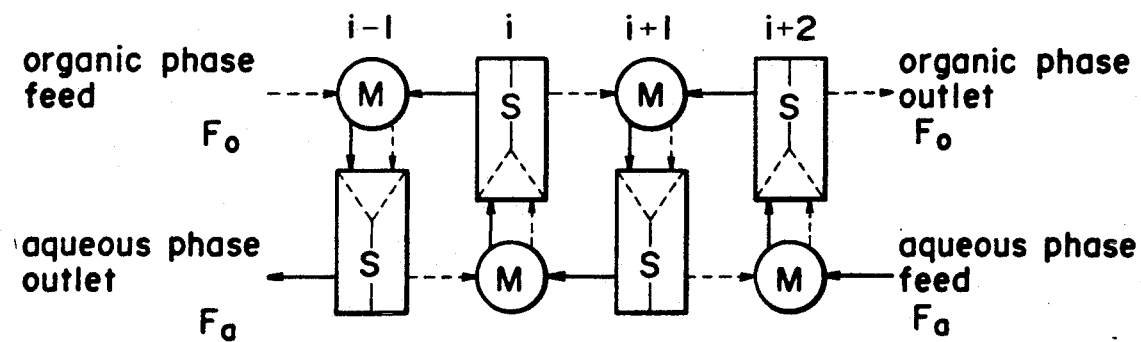
FIG. 10 is a flow diagram of a multi-stage counter flow system using conventional centrifugal extractors.

The difference of this invention from the conventional extractor shown in FIG. 9 is that a reflux cover 20 as a reflux means is fitted to the upper part of the rotor 3 in such a manner as to encompass the outer periphery of the rotor 3 with a spacing between them, and an orifice 21 is provided in the reflux at a position corresponding to the organic phase draw port 13 of the rotor.

Figure 2:
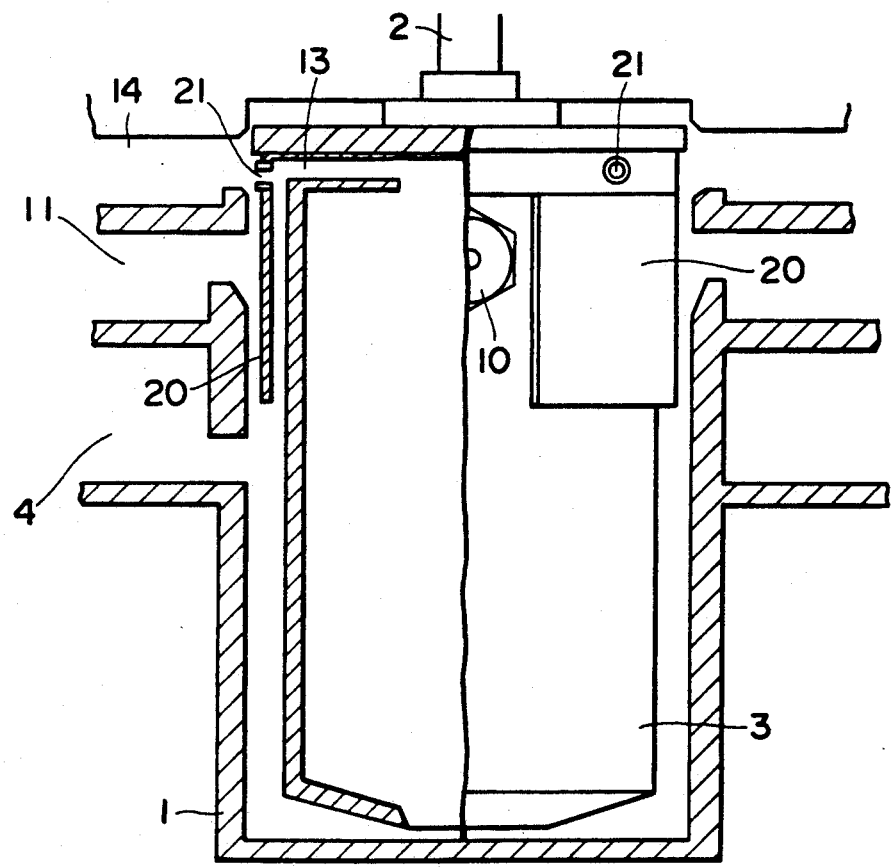
FIG. 2 is a partial sectional view for explaining in more detail a reflux cover shown in FIG. 1.

FIG. 2 shows the shape of the reflux cover 20 in a more comprehensible way. The reflux cover 20 is cut off at the rotor portion through which the aqueous phase draw port 10 opens, so that the aqueous phase withdrawn from the aqueous phase draw port 10 of the rotor 3 can be directly discharged from the aqueous phase outlet 11 of the casing 1.

Since such a reflux cover 20 is fitted, the organic phase withdrawn from the organic phase draw port 13 of the rotor is divided into one apart that is discharged from the organic phase outlet 14 of the casing through the orifice 21 and another part that is returned to the mixing portion 6 at the bottom of the casing through the spacing between the rotor 3 and the reflux cover 20 without passing through the orifice 21, as shown in FIG. 1.

The flow rate that is returned to the mixing portion 6 can be selected in accordance with the diameter of the orifice 21 and when the flow rate ratio (aqueous phase flow rate/organic phase flow rate) is great, a greater reflux flow rate can be obtained by reducing the orifice diameter, so that the flow rate of the organic phase at the mixing portion 6 becomes the sum of the flow rate from the organic phase inlet 4 of the casing 1 and the reflux flow rate. Accordingly, the flow rate ratio can be made smaller.

Figure 3:
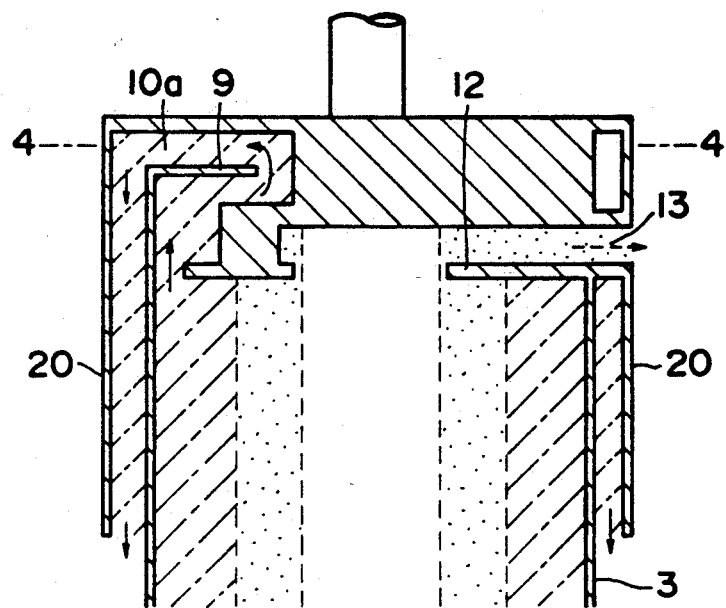
FIG. 3 is a sectional view showing another embodiment using a reflux cover for refluxing an aqueous phase.
Figure 4:
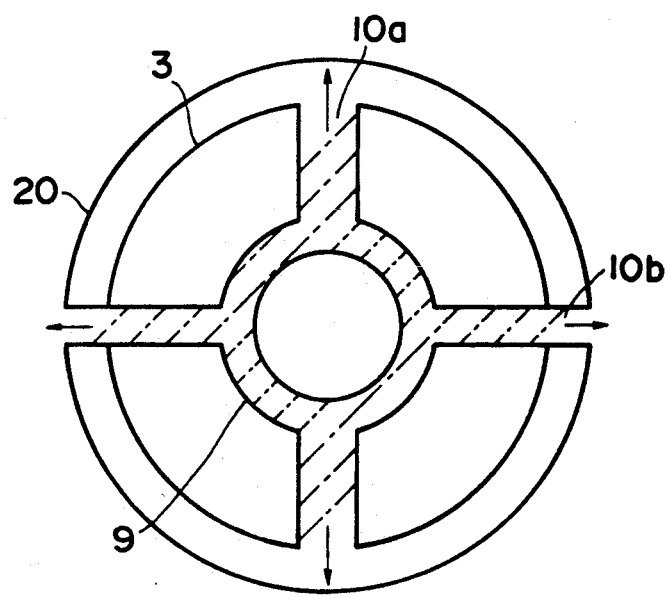
FIG. 4 is a horizontal sectional view along line 4—4 of FIG. 3.

FIGS. 3 and 4 show another embodiment which uses a reflux cover as a reflux means. The reflux cover 20 in this embodiment has the function of refluxing the aqueous phase, and the liquid overflowing from the aqueous phase discharge weir 9 is discharged from the aqueous phase draw ports 10a and 10b. The liquid from the aqueous phase draw port 10a is cut off by the reflux cover 20, flows down through the spacing between the inner surface of the cover 20 and the outer surface of the rotor 3, and is refluxed to the mixing portion at the bottom of the casing. On the other hand, the liquid flowing through the aqueous phase draw port 10b is not cut off by the cover 20 but is discharged outside the casing 1. The flow rate of the aqueous phase refluxed can be adjusted by the diameter of the pipe communicating with the draw ports 10a and 10b.

Figure 5:
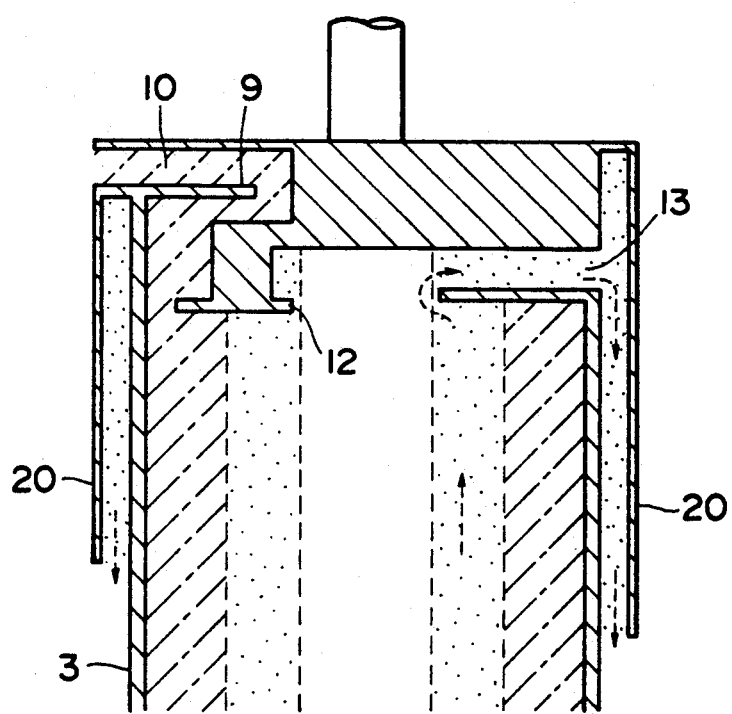
FIG. 5 is a sectional view of still another embodiment using a reflux cover for refluxing an organic phase.

FIG. 5 shows still another embodiment wherein the shape of the reflux cover shown in FIG. 3 is somewhat modified so as to reflux the organic phase. Part of the organic phase withdrawn from the organic phase draw port 13 is cut off by the reflux cover 20 and is refluxed to the mixing portion at the bottom of the casing.

Figure 6:
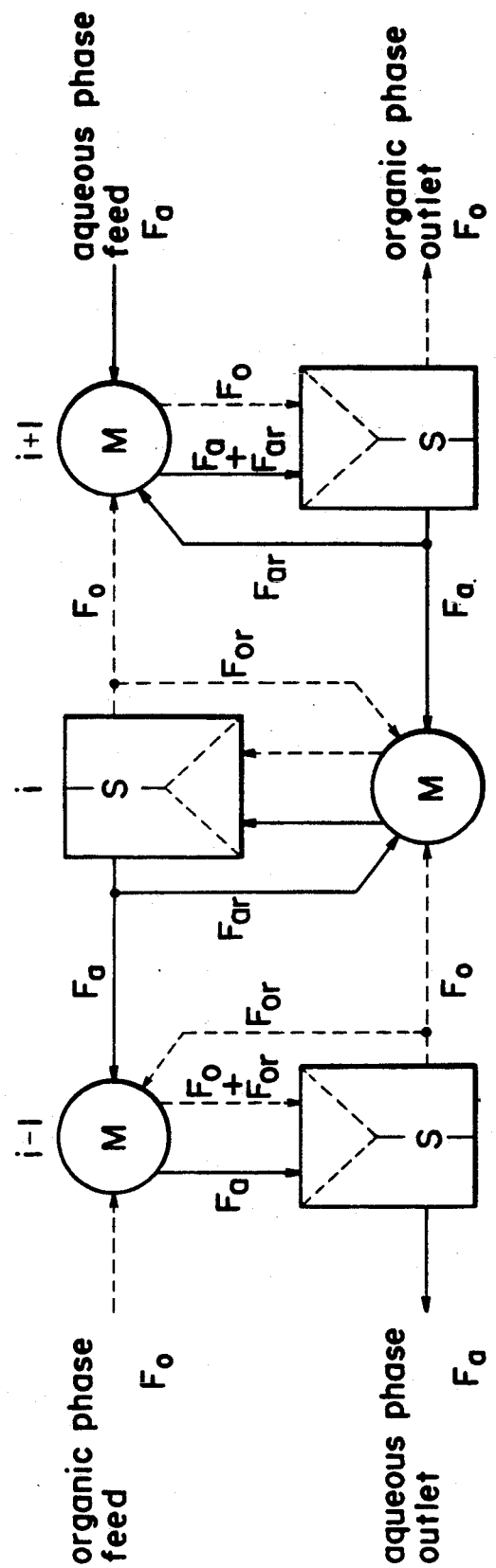
FIG. 6 is a flow diagram of a multi-stage counter flow system using the internal circulation type centrifugal extractors of the present invention.

FIG. 6 shows a multi-stage counter flow when a plurality of the internal circulation type centrifugal extractors of the present invention, each having the structure described above, are disposed in multiple stages in order to bring the organic phase and the aqueous phase into counter flow contact. Each centrifugal extractor comprises the mixing portion M and the phase separation portion S, and these extractors are disposed in multiple stages such as an i−1 stage, an i stage, an i+1 stage, and so forth. Though FIG. 6 shows the reflux flows of both of the organic and aqueous phases, the object of the present invention can be accomplished by refluxing only one or the other of these phases (the phase having a smaller flow rate) in a practical application.

Among the organic phase withdrawn from the phase separation portion S of the i−1 stage, the flow rate corresponding to $F_{or}$ is refluxed and is again supplied to the mixing portion M of the same stage. From this mixing portion M is supplied the organic phase as the sum $F_o+F_{or}$ of the feed flow rate $F_o$ and the reflux flow rate $F_{or}$ to the phase separation portion S. Accordingly, the flow rate ratio (aqueous phase flow rate/organic phase flow rate) at the mixing portion M and phase separation portion S of the i−1 stage becomes $F_a/(F_o+F_{or})$.

In contrast, in the conventional centrifugal extractor which is not of the internal circulation type, the reflux corresponding to $F_{or}$ does not exist. Therefore, the flow rate ratio is $F_a/F_o$ which is determined by the flow rate supplied from the outside, as already described. Therefore, in the case of dodecane washing where $F_o$ is by far smaller than $F_a$, $F_a/F_o$ becomes about 100 and sufficient mixing characteristics cannot be obtained.

However, when the organic phase is refluxed so as to obtain the flow rate ratio of $F_a/(F_o+F_{or})$, a reflux flow rate $F_{or}$ of 2 to 60 times as much as $F_o$ can be obtained in the embodiment shown in FIG. 1, and the flow rate ratio at the mixing portion M and the phase separation portion S can be improved to about 1.6.

Figure 7:
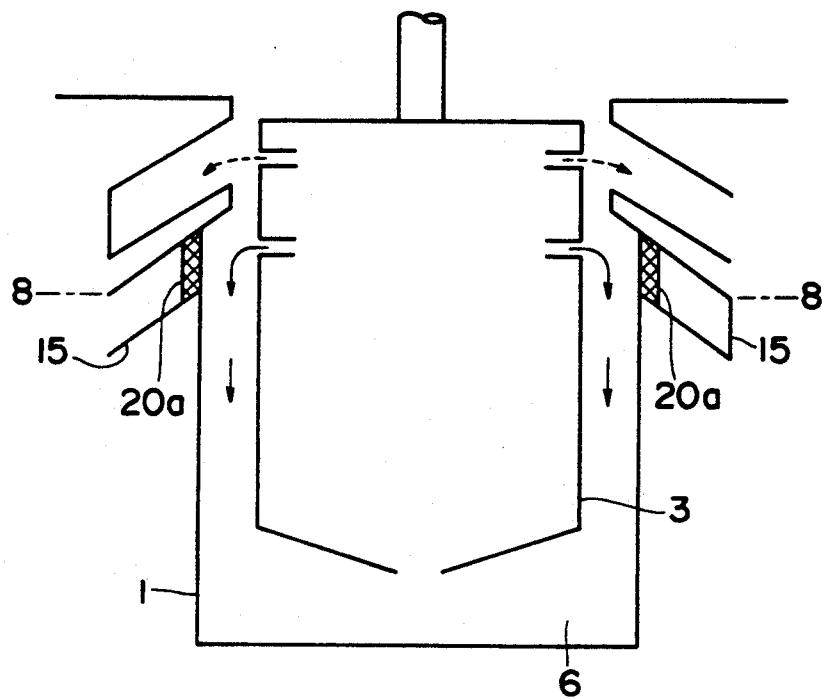
FIG. 7 is a sectional view showing still another embodiment of a reflux means.
Figure 8:
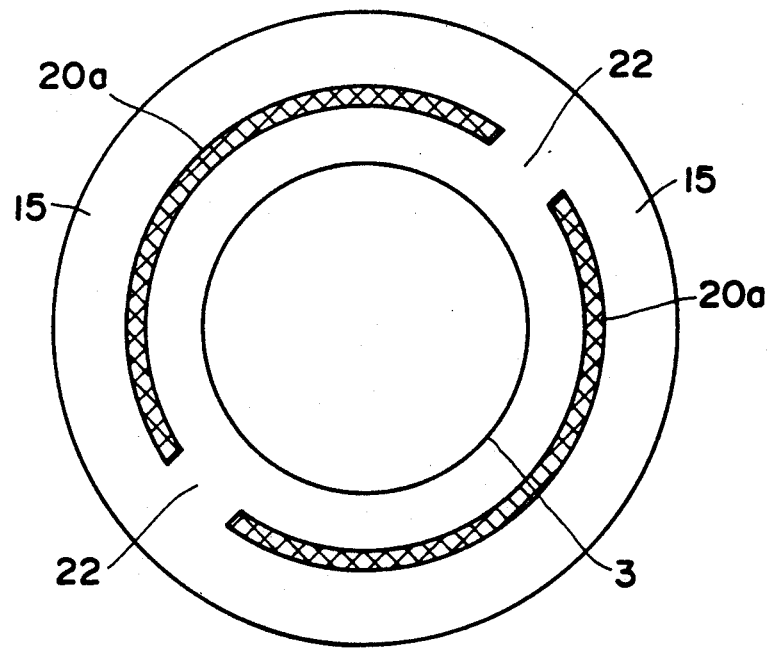
FIG. 8 is a horizontal sectional view along line 8—8 of FIG. 7.

Besides the reflux covers shown in FIGS. 1 to 5, various means can be used as the reflux means to be used in the present invention. As shown in FIGS. 7 and 8, for example, a reflux plate 20a is so fitted as to close part of the inlet of the organic or aqueous phase reception tank (collector) 15 which protrudes outward from the peripheral surface of the casing 1, and the organic phase or aqueous phase withdrawn from the rotor 3 is prevented from entering the reception tank 15 but is refluxed to the mixing portion 6 at the bottom of the casing. Another part of the reception tank 15 is opened and functions as the organic phase outlet or the aqueous phase outlet. The flow rate to be refluxed to the mixing portion 6 can be adjusted by the proportional size of the opening 22 bored in the reflux plate. The arrangement of the reflux plate 20a shown in FIGS. 7 and 8 provides the advantage that the rotor 3 having the same structure as the conventional rotor can be used.

Experimental examples wherein extraction efficiency was improved and the interface was stabilized by the use of the internal circulation type centrifugal extractor shown in FIG. 1 capable of obtaining the reflux flow rate of the organic phase of about 2 to 60 times as much as the feed flow rate of the organic phase are illustrated below.

EXPERIMENTAL EXAMPLE 1

IMPROVING TEST OF EXTRACTION EFFICIENCY

After tributyl phosphate (TBP) was dissolved in pure water in a concentration of 400 mg/l, an extraction test of TBP in an aqueous phase by dodecane was carried out. The aqueous phase feed flow rate was 50 l/hr and a dodecane feed flow rate was 0.5 l/hr as the extraction condition. Whereas the TBP extraction ratio was 73% in the conventional centrifugal extractor not having internal circulation, the TBP extraction ratio could be improved to 86% by improving the flow rate ratio from 100 to 7.1 by the use of the internal circulation type centrifugal extractor for refluxing the organic phase.

EXPERIMENTAL EXAMPLE 2

STABILIZATION TEST OF INTERFACE

Under the extraction condition of the aqueous phase (3N $HNO_3$) feed flow rate of 130 l/hr and the organic phase (30% TBP/dodecane) feed flow rate of 2 l/hr, the organic phase aqueous phase interface moved towards the center of the rotor in the conventional centrifugal extractor not having internal circulation and since entrainment of the aqueous phase into the organic phase occurred, the operation became impossible. On the other hand, when the organic phase reflux flow rate was set to 120 l/hr by the use of the internal circulation type centrifugal extractor under the same conditions as described above, the entrainment dropped below the measurement limit and stabilization of the interface was evidenced.

As can be understood from the Experimental Examples described above, contact can be sufficiently accomplished between the organic phase and the aqueous phase at the mixing portion of the extractor even when the aqueous phase flow rate supplied to the extractor is greater than the organic phase flow rate supplied to the extractor (that is, when the flow rate ratio is great), and extraction efficiency can be improved, as well. Since the organic phase-aqueous phase interface can be kept at a suitable position at the phase separation portion inside the rotor, the entrainment of the aqueous phase into the organic phase withdrawn from the weir can be reliably prevented.

While the present invention has been described with respect to preferred embodiments, it should be apparent to those skilled in the art that numerous modifications may be made thereto without departing from the scope of the invention.

What is claimed is:

1. A centrifugal extractor for use in extraction of first and second liquid phases, comprising:
   a cylindrical casing having a first phase inlet and a second phase inlet in a lower part thereof, a fist phase outlet and a second phase outlet in an upper part thereof, an inner wall, and a bottom wall;
   a cylindrical rotor rotatably mounted in said casing for high speed rotation, said cylindrical rotor being spaced from said inner wall of said casing and from said bottom wall of said casing to form gaps therebetween, said gap between said rotor and said bottom wall of said casing constituting a mixing chamber, and a supply port being formed in a bottom of said rotor for supplying a mixture of the first and second phases into said rotor from said mixing chamber;
   wherein a first phase draw port and a second phase draw port are formed in an upper part of said rotor at positions corresponding to positions of said first phase outlet and said second phase outlet, respectively, of said casing for directing the first and second phases flowing from inside said rotor toward said first and second phase outlets, respectively;
   wherein a first phase weir and a second phase weir are mounted in said rotor for guiding the first phase and the second phase, separated from one another by centrifugal force inside said rotor, to said first phase draw port and said second phase draw port, respectively; and
   wherein a reflux cover is fitted to said upper part of said rotor to encompass an outer periphery of said rotor and maintain a space between said outer periphery of said rotor and said reflux cover, said reflux cover constituting a reflux means for causing one of the first and second phases flowing out through its respective draw port toward its respective outlet to be partially diverted to said mixing chamber.

2. A centrifugal extractor as recited in claim 1, wherein
   said reflux cover includes a port formed therein at a position corresponding to the position of one of said first and second phase outlet ports, to allow a non-diverted portion of the one of the first and second fluids to flow out through a respective one of said first and second phase outlets.

3. A centrifugal extractor as recited in claim 1, wherein
   said reflux means is operable to cause the first phase flowing out through said first phase draw port to be partially diverted to said mixing chamber.

4. A centrifugal extractor as recited in claim 1, wherein
   said reflux means is operable to cause the second phase flowing out through said second phase draw port to be partially diverted to said mixing chamber.

* * * * *